Aug. 28, 1962 TAKAYOSHI SATO ET AL 3,051,064
AUTOMATIC EXPOSURE CONTROL APPARATUS FOR PHOTOGRAPHIC CAMERA
Filed June 24, 1960 4 Sheets-Sheet 1

United States Patent Office 3,051,064
Patented Aug. 28, 1962

3,051,064
AUTOMATIC EXPOSURE CONTROL APPARATUS
FOR PHOTOGRAPHIC CAMERA
Takayoshi Sato and Atsutada Nakatani, Tokyo-to, Japan, assignors to Kabushiki Kaisha Koparu, Tokyo-to, Japan
Filed June 24, 1960, Ser. No. 38,605
Claims priority, application Japan June 24, 1959
7 Claims. (Cl. 95—10)

The present invention relates to an automatic exposure control apparatus for photographic camera, and more particularly to a mechanism and method of automatic exposure control utilizing a differential gear means which is controlled by a light responsive electric element serving for controlling or actuating two exposure control factors, that is, an exposure time and a diaphragm aperture control mechanism.

A principal object of this invention is to provide an automatic exposure control apparatus for photographic camera of the type in which a diaphragm aperture corresponding to a setting shutter speed is automatically determined by the diaphragm aperture control mechanism, and in the case that diaphragm blades are positioned to the minimum aperture under the predetermined shutter speed, that is, the exposure control factors are not set at a suitable exposure value which is indicated by the element of a light-meter, the shutter speed is automatically adjusted again by the exposure time control mechanism.

Another object of the invention is to provide an automatic exposure control apparatus for photographic camera of the type in which a rotational movement of a means corresponding to the degree of exposure controlled by the light-meter built in the camera, is transmitted by the rotational movement of two shafts which are respectively connected with the exposure time and diaphragm aperture control mechanisms.

Another object of the invention is to provide an automatic exposure control apparatus for photographic camera of the type in which a ring member connected with a shutter charging member is rotatably mounted around the shutter casing, and in the shutter charging trip, the exposure time and diaphragm aperture control mechanisms are equipped so as to set the suitable exposure value which is determined by the light-meter.

A further object of the invention is to provide an automatic exposure control apparatus for photographic camera of the type in which the ring member rotatably mounted around the shutter casing is released by the shutter releasing operation from the cocked position, and in its return movement, at first, the exposure time and diaphragm aperture control mechanisms are automatically set corresponding to the degree of exposure controlled by the light-meter, and the shutter operating means is released by the ring member after its adjusting movement.

These and other desirable objects may be attained in the manner disclosed as an illustrative embodiment of the invention in the following description and in the accompanying drawings, in which.

Figure 1:
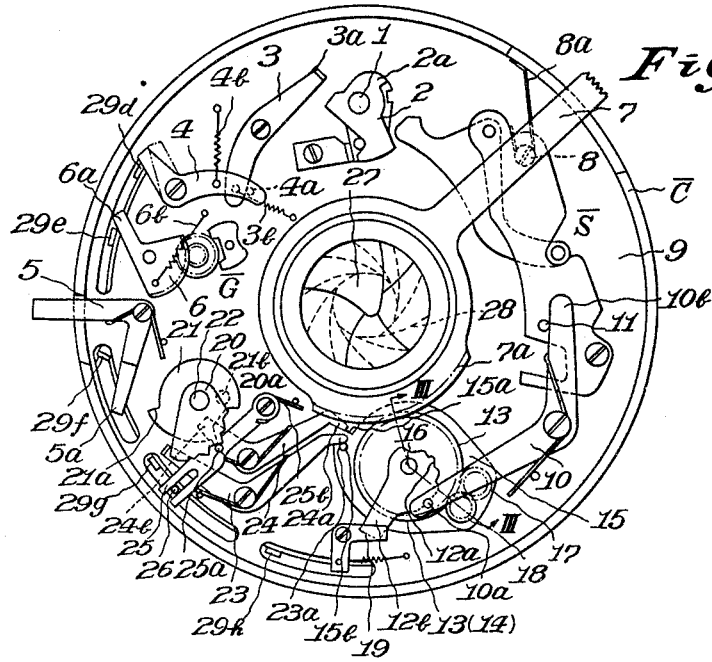
FIG. 1 is a front face view, somewhat diagrammatic, of an automatic exposure control mechanism built in the shutter casing in accordance with this invention, in which the mechanism is not set.

An actual embodiment of this invention will be described in connection with FIGS. 1 through 9, in which a shutter casing $\overline{C}$ comprises a shutter blade operating means, a diaphragm blade operating means not shown in detail, an automatic exposure control mechanism, a shutter speed adjusting lever 7 rotatably mounted around the lens cylinder, and a ring member 29 rotatably mounted around the shutter casing $\overline{C}$.

The shutter blade operating means comprises a cocking shaft 1 having a tension lever 2 in which is formed a hooked portion 2a rotatably mounted on the mechanism plate 9, the tension lever 2 operating a shutter blade operating ring not shown, carrying out opening and closing of the shutter blades 27, a latch lever 3 rotatably mounted on the mechanism plate 9 arranged so as to engage a lug 3a thereon with the hooked portion 2a, a lever 4 rotatably mounted on the plate 9 arranged so as to engage a pin 4a thereon with the latch lever 3, a shutter release lever 5 rotatably mounted on the mechanism plate 9.

Figure 3:
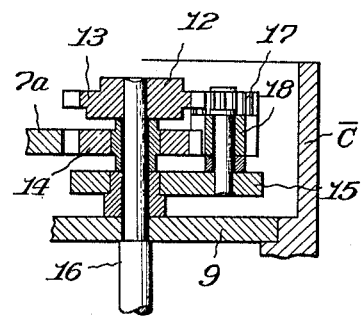
FIG. 3 is a fragmentary sectional view taken on the line III—III of FIG. 1.

The automatic exposure control mechanism comprises a shutter speed adjusting governor $\overline{S}$ constructed by the conventional gear train rotatably pivoted at a shaft 8 fixed on the mechanism plate 9, a lever 10 rotatably mounted on the mechanism plate 9 and arranged so as to engage an end portion 10b thereof with a pin 11 fixed on the shutter speed adjusting governor $\overline{S}$, a gear 13 having an exposure time control cam 12 in which are formed the cam steps 12a engaging with a pin 10a on the lever 10, and the gear 13 having a connecting shaft 16 projected rearward of the shutter casing $\overline{C}$, a gear 14 having the same module and tooth number as the gear 13 rotatably mounted around the connecting shaft 16 and meshed with teeth 7a of the shutter speed adjusting lever 7, a plate member 15 having a hook 15a and a pin 15b rotatably mounted around the connecting shaft 16, two gears 17 and 18 meshing with each other rotatably pivoted on the plate member 15, and said gears 17, 18 meshing with the gears 13, 14, respectively, as shown in FIG. 3, a crank lever 19 rotatably mounted on the mechanism plate 9 arranged so as to engage with an arm 12b of the shutter speed control cam 12 when the automatic exposure control mechanism is cocked, in addition, a diaphragm aperture control cam 20 in which are formed the cam steps 20a, a plate member 21 having a hook 21a and a pin 21b, a connecting shaft 22 having the diaphragm aperture control cam 20 and the plate member 21 as one body rotatably mounted on the mechanism plate 9, and the connecting shaft 22 projecting rearward of the shutter casing $\overline{C}$, a fork-shaped lever 25 having a pin 25a which is engaged with the cam steps 20a, and the fork-shaped lever 25 connecting with a pin 26 fixed on a conventional diaphragm blade operating member not shown carrying out opening and closing of the diaphragm blades 28, a first lever 23 rotatably mounted on the mechanism plate 9 arranged so as to engage an end portion 23a thereon with the pin 15b on the plate member 15 and so as to engage a lug 23b thereon with the hook 21a of the plate member 21, a second lever 24 rotatably mounted on the mechanism plate 9 arranged so as to engage a hooked end 24a thereon with the hook 15a of the plate member 15 and so as to engage an end portion 24b thereon with the pin 21b on the plate member 21.

Figure 8:
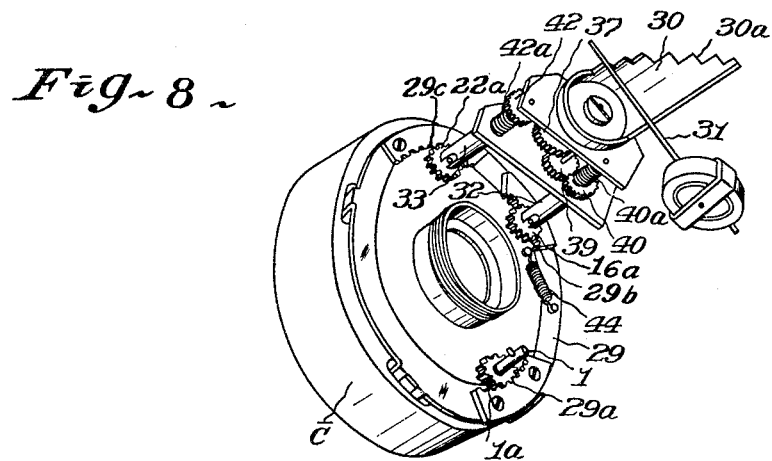
FIG. 8 is a perspective view, somewhat diagrammatic, of an actuating mechanism for the automatic exposure control mechanism.
Figure 9:
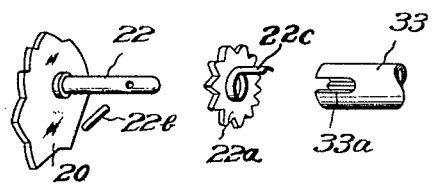
FIG. 9 is an enlarged perspective view which shows the connection of the automatic exposure control mechanism and the actuating mechanism.

The ring member 29 provides with a first toothed portion 29a meshing with a gear 1a which is constructed so as to rotate the cocking shaft 1 only in one direction, a second toothed portion 29b meshing with a gear 16a which is constructed so as to rotate the connecting shaft 16 only in one direction, a third toothed portion 29c meshing with a gear 22a which is constructed so as to rotate the connecting shaft 22 only in one direction as shown in FIGS. 8 and 9, a lug 29d operating the lever 4 so as to rotate clockwise at the last movement of the shutter releasing operation, a lug 29e engaging with an arm 6a of a sector gear 6 of the gear governor $\overline{G}$ which retards the return movement of the ring member 29, a hook 29f which is engaged with an end 5a of the release lever 5 in cocked position, a lug 29g operating the fork-shaped lever 25 so as to rotate counter clockwise in the cocking operation, a lug 29h rotating the crank lever 19 in the clockwise direction in the shutter releasing operation.

An actuating mechanism for the automatic exposure control mechanism comprises a differential gear means including a driving spring and a stop means. This differential gear means alternately actuates the shutter speed control mechanism and the diaphragm control mechanism by a respective driving spring, until the stop means rests in contact with the light meter. The momentum of the stop means corresponds to the degree of exposure detected by the light meter, and is transmitted to the differential gears as a rotational movement. Some disclosures of this stop means are already known in the art, e.g. U.S. Patent No. 2,868,095. Most of the disclosures can be used for the stop means of the present invention.

In this embodiment, the stop means is illustrated as a drum member 30 which is one of the above-mentioned well known disclosures. The drum member 30, which is connected with a portion 43' of a shaft 43 and rotates together with the shaft 43, has cam steps 30a which come into contact with the pointer 31 of the light meter L built in the camera body, when the drum member 30 is turned in the counter-clockwise direction. The differential gear means comprises a plate 34 securely mounted around a shaft 43 so as to rotate together the drum member 30, a gear 37 and 38 rotatably mounted around the shaft 43 respectively, a gear 35 and 36 meshed with each other and respectively meshed with gears 37 and 38. The gears 35 and 36 are rotatable around a pivotal shaft which is secured on the plate 34. A gear 42 fixed to the connecting cylinder 33 meshes with a gear 41 which is meshed with the gear 37, and a gear 40 fixed to the connecting cylinder 32 meshes with a gear 39 which is meshed with the gear 38. The connecting cylinder 32 is connected with the shaft 16 by means of a pin 16b and a slot 32a, and the connecting cylinder 33 is connected with the shaft 22 by means of a pin 22b and a slot 33a.

FIG. 9 is an exploded view which shows the connection of the connecting cylinder 33 and the connecting shaft 22. The connecting shaft 22 extends through the center hole of the gear 22a, and the pin 22b engages with the slot 33a of the connecting cylinder 33, so that the rotary movement of the connecting cylinder 33 by the driving spring 42a is transmitted to the shaft 22. The gear 22a meshes with the toothed portion 29c. This connection is similar to the connection of the connecting cylinder 32 and the connecting shaft 16. In the clockwise movement of the ring member 29, a projection 22c of the gear 22a engages with the pin 22b, and actuates the shaft 22 and the connecting cylinder 33 to the clockwise direction in FIGS. 8 and 9. At the same time, the driving springs 40a and 42a are tensioned. In the counter-clockwise movement of the ring member 29, the gears 16a and 22a are rotated simultaneously in the respective counter-clockwise direction. In this case, the gears 16a and 22a are rotated independently of the connecting cylinders 32 and 33. Accordingly, when only the cylinder 33 is stopped together with the shaft 22, the cylinder 32 and the shaft 16 are rotated by the driving spring 40a, and when only the cylinder 32 is stopped together with the shaft 16, the cylinder 33 and the shaft 22 are rotated by the spring 42a. The mechanism which acts alternately causing the above-mentioned stopping is arranged within the shutter casing. This mechanism will be understood with more reading.

FIG. 1 corresponds to the state, in which the shutter speed adjusting lever 7 is set at the position accommodated to a desired shutter speed, for example, $\frac{1}{60}$ second.

Figure 6:
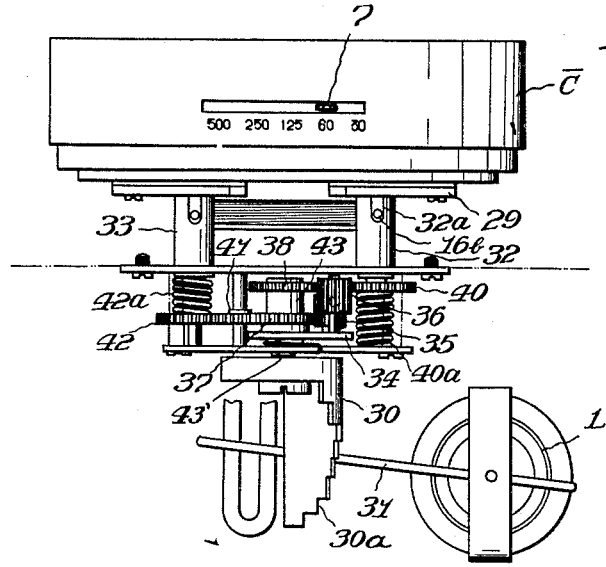
FIGS. 6 and 7 are side views, somewhat diagrammatic of an actuating mechanism related to a light-meter for the automatic exposure control mechanism, in which the actuating mechanism is respectively corresponded to FIGS. 2 and 4.

When the cocking shaft 1 is rotated counter-clockwise by the film winding operation in FIG. 1, the tension lever 2 rotates counter-clockwise while charging a main driving spring not shown. On the other hand, due to the rotation of the shaft 1, the gear 1a rotates the ring member 29 in the clockwise direction against a spring 44 in FIG. 8, whereby the lugs 29d, 29e, 29g, 29h and the hook 29f, respectively, rotate counter-clockwise in FIG. 1. Accordingly, the lever 4 rotates counter-clockwise due to the force of the spring 4b and pushes the latch lever 3 in the clockwise direction so as to bring its lug 3a in engagement with the hook 2a of the tension lever 2, the gear governor $\overline{G}$ is charged by a driving spring 6b, the fork-shaped lever 25 is rotated counter-clockwise around its pivotal shaft by the lug 29g and brings the pin 26 on the diaphragm blade operating ring to such position that the diaphragm blades 28 are fully opened. In this case, the lug 29h pushes upward the end of the crank lever 19 and passes through the underside of the lever 19. On the other hand, due to the rotation of the ring member 29, the connecting shafts 16, 22 and the connecting cylinders 32, 33 are wound up in the clockwise direction at the same time in FIG. 8. Accordingly, the exposure time control cam 12 and the gear 13 are rotated counter-clockwise, and the end portion 12b of the exposure time control cam 12 is engaged with the crank lever 19. In this case, as the gear 14 is stationary, the plate member 15 is rotated counter-clockwise by the gears 17 and 18. On the other hand, the diaphragm aperture control cam 20 and the plate member 21 are also rotated counter-clockwise, and the hook 21a of the plate member 21 engages with the lug 23b of the first lever 23. Due to the rotation the connecting cylinders 32 and 33, the driving springs 40a and 42a are wound up and also the drum member 30 is rotated clockwise by the differential gear means. Thus, all mechanisms are brought to the cocked position as shown in FIGS. 2 and 6.

Figure 2:
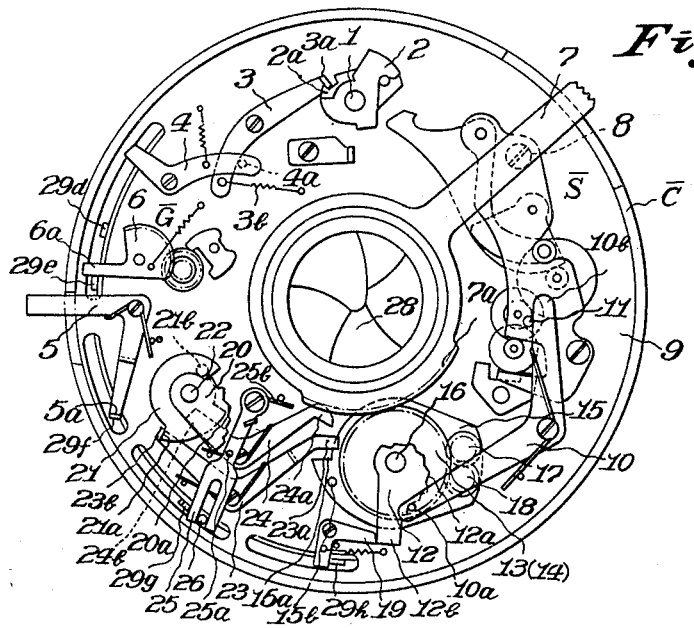
FIG. 2 is a view similar to FIG. 1, in which the shutter operating member and an automatic exposure control mechanism are both in the cocked position.

When the shutter release lever 5 is rotated counter-clockwise by hand in FIG. 2, the end 5a of the shutter release lever 5 disconnects from the hook 29f of the ring member 29, and the ring member 29 rotates clockwise due to the force of the driving spring 44. In this case, by the return motion of the ring member 29 retarded by the gear governor $\overline{G}$, the several operations are carried out as follows: at first, the crank lever 19 is rotated clockwise by the lug 29h and is disconnected from the end portion 12b of the exposure time control cam 12, so that the exposure time control cam 12 is rotated clockwise together with the connecting cylinder 32 by the force of the driving spring 40a. Due to the rotation of the exposure time control cam 12, the gear 17 is rotated counter-clockwise by the gear 13, whereby the gear 18 is rotated clockwise around its pivotal shaft while rotating clockwise around the stationary gear 14. Accordingly, the plate member 15 is rotated clockwise around the connecting shaft 16 until its hook 15a is engaged with the hook 24a of the second lever 24. In this case, as the relative position of the hook 15a and the exposure time control cam 12 is determined already by the set position of the shutter speed adjusting lever 7, the lever 10 is rotated clockwise around its pivotal shaft following the cam step 12a. Due to the rotation of the lever 10, the shutter speed adjusting governor S̄ is rotated counter clockwise around the shaft 8 by the force of the spring 8a. Thus the exposure time is determined corresponding to the set position of the shutter speed adjusting lever 7.

In this case, the diaphragm aperture control cam 20 is not released until the exposure time control cam 12 is stopped.

While the exposure time control cam 12 is rotated as the above, the differential gear means is operated as follows:

When the connecting cylinder 32 is rotated counter-clockwise from a position shown in FIG. 6 to a position stopped by the engagement of the lever 24 and the hook 15a, the gear 39 is rotated clockwise in FIG. 8 around its pivotal shaft by the gear 40, whereby the gear 38 is rotated counter-clockwise. Accordingly, the gear 36 is rotated clockwise around its pivotal shaft whereby the gear 35 is rotated counter-clockwise around its pivotal shaft while rotating counterclockwise around the rotatable gear 37 which cannot rotate around the shaft 43 in this operation, thus causing the counter-clockwise rotation of the plate member 34 together with the drum member 30. In the above-mentioned operation, if the cam step 30a of the drum member 30 is not yet contacted with the pointer 31 by the little rotation of the connecting cylinder 32, the drum member 30 may be rotated successively counter-clockwise by the driving spring 42a, which is released when the hook 21a of the plate member 21 is disengaged from the lug 23b of the first lever 23 by the pin 15b on the plate member 15. In this case, the cylinder 33 is rotated counter-clockwise together with the gear 42 by the spring 42a, and the gear 41 is rotated clockwise. Accordingly, the gear 36 is rotated counter-clockwise around the gear 37 which now cannot rotate around the shaft 43 by the engagement of the hook 24a and the hook 15a. Consequently, the plate member 34 is rotated counter-clockwise together with the drum member 30.

Figure 4:
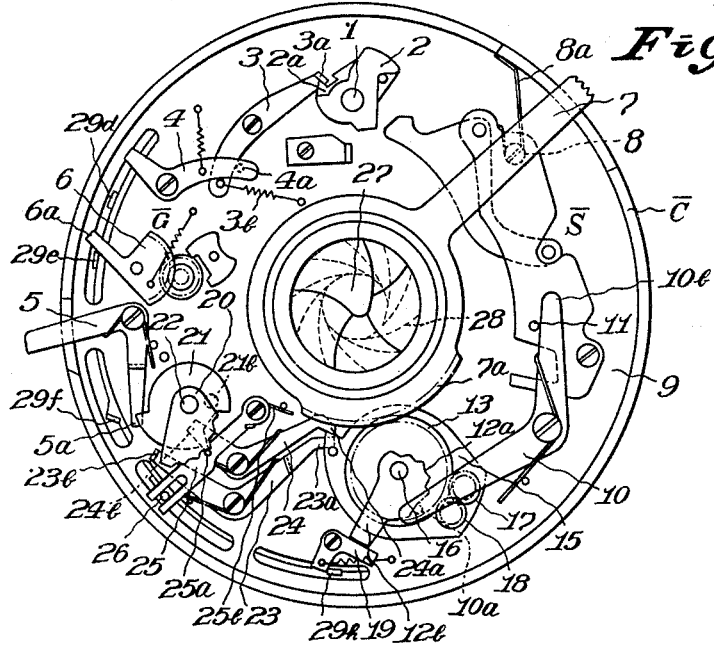
FIGS. 4 and 5 are views similar to FIG. 1, in which an automatic exposure control mechanism is set at the position corresponding to one or other suitable exposure condition controlled by an actuating mechanism, by shutter releasing operation, but a shutter operating member is not released.
Figure 7:
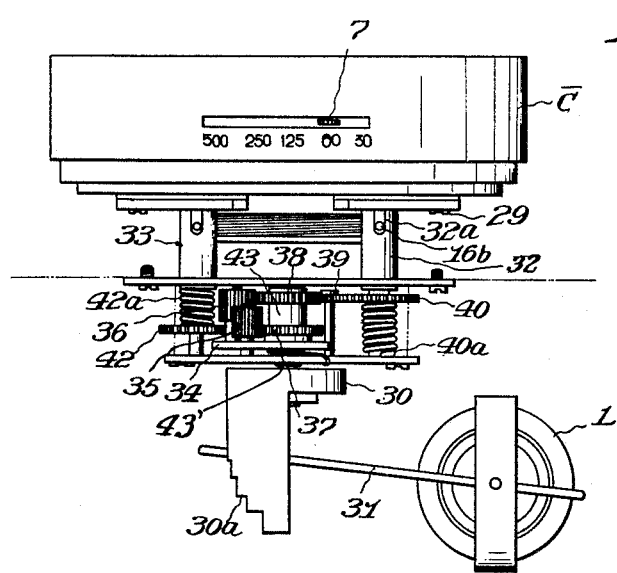

In the operation of the cylinder 33 as described above, the lug 29g rotating clockwise is accompanied by the forked-shaped lever 25 until the pin 25a contacts with the cam steps 20a, as shown in FIG. 4, i.e., until the drum member 30 comes in contact with the pointer 31 as shown in FIGS. 7 and 8. In this case, the rotational angle of the drum member 30 is determined by the position of pointer 31 corresponding with the cam steps 30a.

The lug 29d pushes the lever 4 clockwise after the entire adjusting operation mentioned, whereby the latch lever 3 is rotated counterclockwise by the spring 3b so as to release the tension lever 2. Accordingly, the tension lever 2 carries out opening and closing of the shutter blades 27 in the conventional manner.

Figure 5:
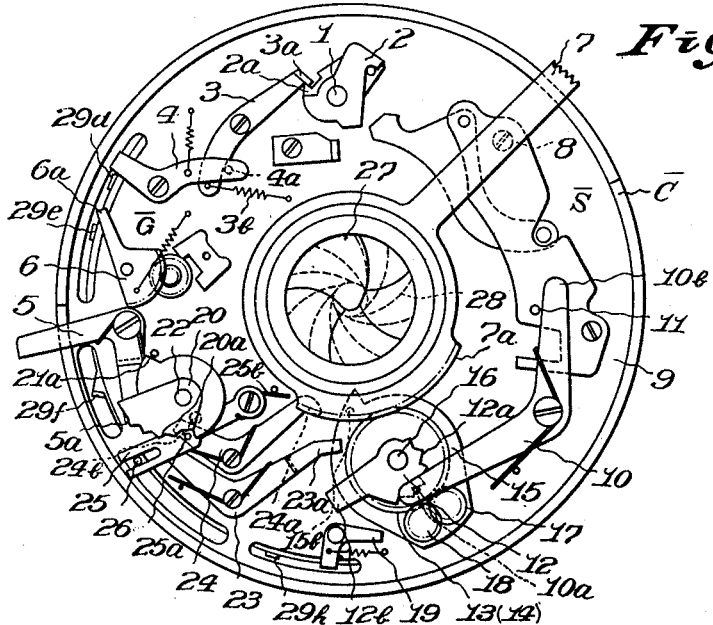

Furthermore, according to this invention, when the diaphragm aperture control cam 20 reaches the position corresponding to the minimum exposure aperture, for example, f:22, before the cam step 30a of the drum member 30 contacts the pointer 31 of the light-meter L, the pin 21b on the plate member 21 pushes the second lever 24 in the counter-clockwise direction so as to disconnect its hooked end 24a from the hook 15a of the plate member 15, whereby the exposure time control cam 12 is rotated again clockwise in such a manner as already described until the cam step 30a of the drum member 30 contacts the pointer 31 of the light-meter L. According to this operation the exposure time control mechanism is automatically set so as to obtain shutter speed higher than the pre-set shutter speed, for example, 1/125 sec., 1/250 sec., or 1/500 sec. as shown in FIG. 5. According to this invention as described above, by the provision of the ingenious exposure control mechanism and its actuating mechanism, the exposure time and diaphragm aperture are automatically determined in accordance with the light condition measured by the built-in light meter L.

Furthermore, according to the mechanism of this invention, there is advantage that by provision of the simple ring member 29, the cocking operation of the shutter blade operating means and the exposure control mechanism can be carried out at the same time, and, moreover, the releasing operation of the exposure control mechanism and shutter blade operating means can be successively carried out.

While we have shown and described certain specific embodiments of our invention, we are fully aware that many modifications thereof are possible. This invention, therefore, is not to be restricted within the description of the specification.

We claim:

1. In a photographic camera including a shutter blade operating means for opening and closing the shutter blades, the combination of an automatic exposure control mechanism including a photoelectric light meter which comprises a differential gear assembly including a differential gear and two cylinders which are alternately rotated by a driving spring, stop means, a pointer on the photoelectric light meter to engage said stop means, a shutter speed control device including a shutter speed preset means, a shutter speed delaying mechanism, a shutter speed adjusting lever means which pivotally actuates said shutter delay mechanism, a shutter speed adjusting means connected with one of said cylinders and also operatively connected with said preset means and said adjusting lever means, a diaphragm aperture control device including a diaphragm aperture adjusting means connected with said other cylinder, a diaphragm aperture operating lever means engaged operatively with said diaphragm aperture adjusting means, a first lever means unlatching said diaphragm aperture adjusting means when said shutter speed adjusting means finishes a first adjustment preset by said preset means, a second lever means unlatching said shutter speed adjusting means for a second adjustment thereof when said stop means is not yet engaged by said pointer, notwithstanding the first adjustment of said shutter speed adjusting means and the adjustment of said diaphragm aperture adjusting means, and a ring means releasing said shutter blade operating means after said stop means has engaged said pointer.

2. In a photographic camera including a shutter casing, shutter blades, a shutter blade operating means for opening and closing said shutter blades and a shutter speed delaying mechanism, the combination of an automatic exposure control mechanism including a built-in photoelectric light meter having a pointer, a differential gear assembly provided with two cylinders which are alternately rotated by a respective driving spring, said cylinders including stop means to engage said pointer, a shutter speed control device provided with a shutter speed preset means and comprising a shaft connected with one of said cylinders, cam means having a cam step portion and a gear portion mounted on said shaft for adjusting said shutter speed delaying mechanism, a rotatable gear member mounted on said shaft, plate means mounted rotatably on said shaft for determining temporarily the rotational angle thereof by said preset member, a diaphragm aperture control device connected operatively with said other cylinder of said differential gear assembly, a first lever means latching with said diaphragm aperture control device until the rotation of said plate means terminates in accordance with the preset of said preset means, and a second lever means engaging with said plate means in the end position of said rotation and being released by said diaphragm aperture control device, whereby said plate means is rotated further by said driving spring for the further adjustment of said delaying mechanism.

3. A construction as defined in claim 2, wherein said diaphragm aperture control device comprises an additional shaft connected with said other cylinder, a cam segment securely mounted around said other shaft and having a projection and a pin, and a diaphragm aperture adjusting lever pivoted on the shutter mechanism base plate having a pin for engaging with said cam segment.

4. A construction as defined in claim 2, wherein said plate means is combined with a pin to unlatch said first lever means from said diaphragm aperture control device, a projection engaging said second lever means in the rotation thereof, and two gears which respectively mesh with said rotatable gear member and said gear portion of said cam means, and meshing with each other.

5. A construction as defined in claim 2, in which the lever for adjusting the shutter speed delaying mechanism is pivoted on the shutter base plate so as to pivotally adjust the position of said delaying mechanism through said cam segment.

6. A construction as defined in claim 2, wherein said rotatable gear member meshes with a toothed portion of said preset member which is rotatably mounted around the lens tube portion of the shutter casing, and which is provided with a handle portion for use in presetting the preset member.

7. A construction as defined in claim 2, in which a ring means is mounted on the shutter casing, said ring means, in the charging movement thereof, carrying said shutter blade operating means, said shutter speed control device; and said diaphragm aperture control device and said differential gear assembly, to the charged position and, in the run-off movement thereof, releases said shutter blade operating means after an alternate adjustment of said shutter speed control device and said diaphragm aperture control device by means of said differential gear assembly.

References Cited in the file of this patent
UNITED STATES PATENTS

| | | |
|---|---|---|
| 2,868,095 | Gebele | Jan. 13, 1959 |
| 2,923,216 | Greger | Feb. 2, 1960 |
| 2,925,760 | Broschke | Feb. 23, 1960 |
| 2,930,282 | Herterich | Mar. 29, 1960 |